Feb. 9, 1971 R. D. REINHART ET AL 3,561,051

EXTRUSION APPARATUS

Filed Feb. 1, 1967

INVENTORS
RICHARD D. REINHART
ROBERT O. STRAUGHN
BY L. McKoy Lillehaugen

ATTORNEY

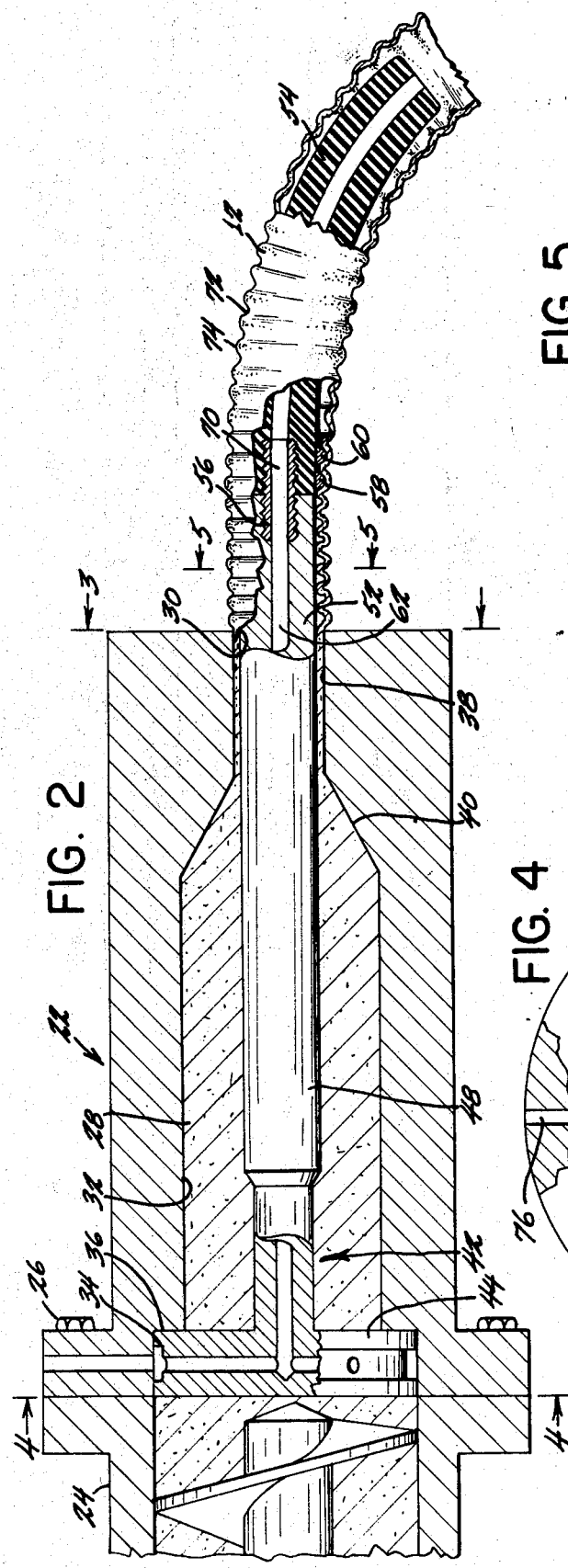

United States Patent Office 3,561,051
Patented Feb. 9, 1971

3,561,051
EXTRUSION APPARATUS
Richard D. Reinhart and Robert O. Straughn, Minneapolis, Minn., assignors to General Mills, Inc., a corporation of Delaware
Filed Feb. 1, 1967, Ser. No. 613,255
Int. Cl. B29d 23/04
U.S. Cl. 18—14                               9 Claims

ABSTRACT OF THE DISCLOSURE

A device for continuously forming an elongated, tubular, corrugated product by forcing an extrudable material through an annular extrusion orifice. The flow of material through the orifice is restrained or restricted in such a manner that the extruded product tends to fold on itself as it emerges from the orifice, thus forming transverse corrugations.

---

It is well known in the art to produce cylindrically shaped tubular products or extrudates, such as macaroni, by forcing a dough material through an extrusion orifice in which one end of a die pin or mandrels is positioned. Tubular shaped products have been formed having other cross-sectional configurations as well, such as oval shapes, square shapes, and the like. According to the known state of the art, such tubular extrudates have been formed with substantially smooth outer and inner surfaces. To the best of applicants' knowledge, it has not been feasible to form a tubular extrudate having a substantially uniform wall thickness throughout, and a plurality of transverse corrugations comprising alternating peak and valley portions, by an extrusion process. According to the known state of the art, corrugated tubes are produced by first forming a tubular extrudate, and subsequently converting the wall of the extrudate into transverse corrugations by a molding process. Such procedures require two steps, an extruding step and a molding step; as such, it requires the use of two types of equipment, extrusion equipment and molding equipment. This increases the cost of producing such corrugated tubes.

Accordingly, one object of the present inventon is to provide an improved apparatus for continuously forming an extruded tubular product.

Another object is to provide an extrusion apparatus for forming a tubular extrudate having a plurality of transverse corrugations.

A further object is to provide an extrusion apparatus for continuously forming a tubular corrugated extrudate having a substantially uniform wall thickness throughout.

Other objects and advantages of the invention will become apparent from a consideration of the following specification and drawings. Before proceeding with a detailed description of the invention however, a brief description of it will be presented.

Briefly, the extrusion apparatus or die assembly includes a die housing having a die chamber therein which terminates in a die opening in the wall or face of the die housing, through which material can be extruded. An elongate die insert or mandrel is positioned within the die chamber so that one of its ends projects into the die opening, thereby defining an annular extrusion orifice. A back-pressure producing device is operatively connected to the die housing in such a manner that it restrains or restricts the free flow of material through the orifice. As a result, as the material emerges from the orifice, it tends to fold on itself and form transverse corrugations or bulges having alternating peak and valley portions, and a uniform wall thickness throughout.

The invention will best be understood by reference to the following drawings in which:

FIG. 2 is an elevational view in partial section showing an extrusion apparatus or die assembly;

FIG. 3 is a partial sectional view taken along line 3–3 of FIG. 2;

FIG. 4 is a partial sectional view taken along line 4–4 of FIG. 2;

FIG. 5 is an enlarged partial sectional view taken along line 5–5 of FIG. 2;

Figure 1:
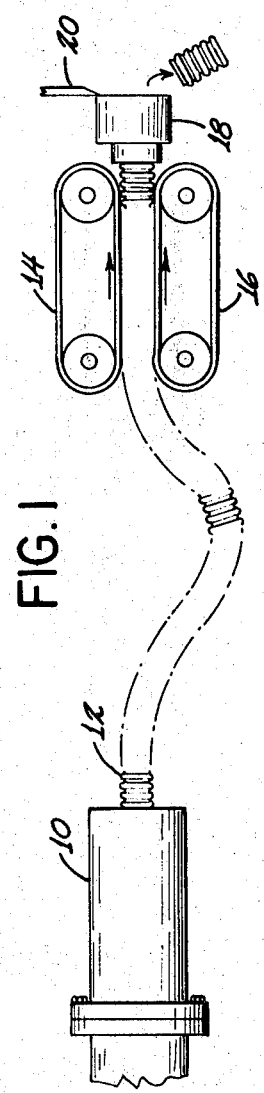
FIG. 1 is a partial schematic view illustrating a corrugated extrudate being formed by an extruder and subsequently being cut into segments of predetermined length.

FIG. 1 illustrates an extrusion apparatus designated generally by reference numeral 10 for forming an extruded product or extrudate 12. A pair of counter-rotating belt assemblies 14 and 16 are provided for gripping the bellows-like material 12 at a point remote from the extruder 10, and advancing and guiding it into an end piece 18, at which point it is cut into segments of predetermined length by a slicing mechanism 20.

FIG. 2 illustrates the extrusion apparatus or die assembly 10 in greater detail. The apparatus includes a die housing 22 which is attached to the barrel of an extruder 24 by means of bolts 26. The die housing 22 is provided with a die chamber or passage 28 which communicates with a die opening 30 in the face of the die assembly. The chamber 28 is formed in four portions, a first cylindrical bore 32, a second cylindrical bore 34 which forms a shoulder 36 with the bore 32, a third cylindrical bore 38 which defines the opening 30, and a frusto-conical portion 40 which connects the bores 32 and 38 together and defines a transition passage.

A die insert or mandrel 42 is positioned within the chamber 28 and it includes a mounting ring member 44, spokes or arms 46, and an elongate stem 48 which is connected to the ring member 44 by means of the arms 46. As noted in FIG. 4, passages 50 are formed for permitting material to flow from the extruder 24 into the die housing 22. The mandrel 42 is press fit within the bore 34 in such a manner that end 52 of the stem 48 projects through the die opening 30. As noted, the stem 48 is smaller in cross-section than the die opening 30, so that an annular extrusion orifice is formed. As illustrated in FIG. 3, the die opening 30 has a substantially circular cross-sectional shape, and the stem 48 likewise has a circular cross-sectional shape. In this regard, if desired, the opening 30, as well as the stem 48 might have a different cross-sectional shape such as oval shaped, or the like. If desired, an adjusting mechanism (not shown) might be provided for adjusting the position of the stem end 52 within the die opening 30 so that it is concentric with respect to the opening.

A flexible tube 54 is secured to the end 52 of the mandrel stem by means of a threaded member 56. The tube 54 serves as a support for the extrudate 12 as it is discharged through the extrusion orifice, and its relative length can vary. The tube 54 is substantially the same size as, and it has substantially the same cross-sectional shape as, the stem end 52. One or more ring-shaped members 58 and 60 are mounted on the tube 54 proximate the end of the stem. The rings 58 and 60 are spaced apart relative to each other, and they are formed so that they fit quite snugly on the surface of the tube 54, so that they do not move axially. As shown, both rings are mounted on the tube in such a manner that they encircle the threaded member 56. If desired of course, the tube 54 might be formed in such a manner that the ring-shaped members form an integral part of the tube. As explained below, the rings 58 and 60 form a back-pressure producing device which restrains or restricts the free flow of material away from the extrusion orifice.

The stem 48 is provided with an air passage 62 which extends parallel to the longitudinal axis of the mandrel. The passage 62 leads into each of three radially extending passages 64 formed in the spokes 46; the passages 64 in turn communicate with a groove 66 formed in the periphery of the mounting ring 44. As illustrated in FIG. 2, a passage 68 is formed in the die housing 22, and it communicates with the groove 66 and the passages 62 and 64. Means, not shown in the drawings, are provided for supplying pressurized air into the passages. As noted in FIG. 2, the threaded member 56 is likewise provided with a passage 70 which is aligned with the passage 62.

In operation, it has been found that this invention is particularly useful in forming ready-to-eat food products. Ingredients which form such products are mixed and cooked to form a gelatinized cereal dough which is then extruded to form a product having the desired shape and size. In general, doughs derived from wheat, corn, oats, rye or the like, as well as mixtures of these cereal grains, can be used and cooked to the desired degree of gelatinization in any conventional manner. Additional steps such as cutting, puffing, drying and the like, are thereafter performed to complete the process. Since this invention concerns the extrusion apparatus, the other equipment used in the processing operation will not be described in detail.

The overall processing conditions, such as the optimum temperature, pressure, and moisture conditions within the equipment, can vary depending upon the type of dough being processed, the desired characteristics of the final product, and the like. Generally, the extrudate when discharged should be somewhat pliable so that it will stretch without breaking, and it should not be overly sticky or tacky. Since the specific processing conditions do not form a part of this invention, they will not be described in further detail.

As depicted in FIG. 2, the dough material is forced through the extrusion apparatus 10, and more particularly the extrusion chamber 28 and extrusion orifice by the extruder 24. It must be understood of course, that the extruder 24 merely illustrates one type of device which might be used for forcing the dough material through the apparatus. As pressure is exerted on the dough material it is forced through the passages 50, through the bore 32, through the tapering passage 40, and into the annular passage formed within the bore 38 by the mandrel stem 52 and the cylindrical surface of the bore.

As the dough material is discharged through the orifice, its free flow away from the face of the housing is restrained or restricted by means of the back-pressure producing device, i.e. the ring-shaped members 58 and 60. In other words, the ring-shaped members 58 and 60 in effect, block the free flow of the extrudate, and they cause the pliable material to fold on itself and thereby form transverse corrugations having alternating peak and valley portions 72 and 74 respectively. As the individual corrugations by-pass the members 58 and 60, they are supported by the flexible tube 54 for a short distance. As noted in FIG. 1, the extrudate loops downwardly before it is engaged by the belt assemblies 14 and 16. The path of the extrudate in this manner causes it to stretch out, and adjacent corrugations to separate somewhat from each other. As can be seen, the extrudate has a bellows-like configuration.

Pressurized air is discharged through the passage 62 into the extrudate 12. While not absolutely essential, the pressurized air serves several purposes. It aids in supporting the extrudate after the individual corrugations pass by the end of the tube 54 so that the extrudate does not collapse; it aids in stretching the extrudate so that the corrugations separate from each other; it cools the extrudate; and it aids in controlling the drag caused by the rings 58 and 60. As to the latter, by increasing the flow of air through the passage 62, and consequently the tube 54, some of the air flows rearwardly between the extrudate, and the tube 54, the rings 58 and 60, and the stem end 52, thus reducing the friction between the extrudate, and these members. Conversely, by decreasing the flow of air, the amount of drag can be increased. Thus, the air pressure in effect, aids in controlling the amount of drag caused by the back-pressure producing device.

Figure 7:
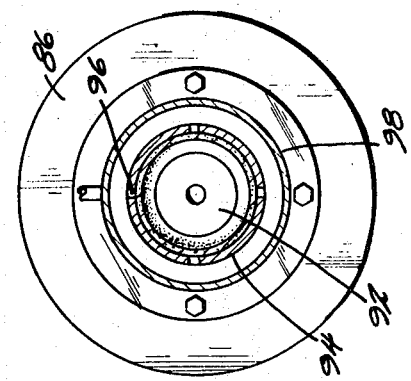
FIG. 7 is a sectional view taken along line 7—7 of FIG. 6.
Figure 6:
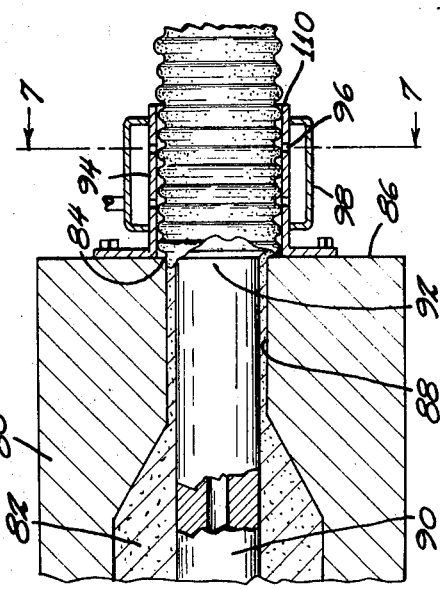
FIG. 6 is a partial sectional view illustrating another embodiment of the invention.

FIGS. 6 and 7 illustrate another embodiment of the invention. This embodiment is quite similar to that depicted in FIG. 2, in that the extrusion apparatus includes a die housing 80 having a die chamber or passage 82 therein and a die opening 84 formed in the face 86 of the die housing. The passage 82 includes a cylindrical bore 88 which forms a die opening. A die insert or mandrel 90 is positioned within the passage 82 in such a manner that the end 92 projects into the cylindrical bore 88. As illustrated in FIG. 6, the end of the mandrel does not extend beyond the face 86 of the die housing 80, but terminates flush with the face surface. If preferred of course, the end of the mandrel could extend beyond the face of the housing 80. As shown in FIG. 7, the mandrel stem as a circular cross-sectional shape; therefore, it is substantially the same as the shape of the die opening 84.

A tubular cowling 94 is secured to the end face 86 of the housing 80 by appropirate means, in such a manner that it is aligned with the passage 82 formed in the housing. The cowling 94 has an internal diameter and shape which corresponds to the desired external diameter and shape of the corrugated extrudate as it emerges from the extrusion orifice. The cowling acts as a back-pressure producing device in that it restricts or impedes the flow of the extrudate away from the extrusion orifice, in much the same manner as the ring members 58 and 60 described above in conjunction with FIG. 2. Thus, it causes the extrudate to fold on itself and form transverse corrugations having alternating peak and valley portions. A plurality of passages 96 are formed in the cowling for admitting pressurized air into the cowling; and a manifold 98 which surrounds the cowling 94, and more particularly the passages 96, distributes air to the passages. The amount of friction between the extrudate and the cowling can be increased or decreased by controlling the amount of air supplied. If desired, a tube, a similar to the tube 54 depicted in FIG. 2, might be provided for supporting the extrudate as it is advanced away from the extruder.

The operation of this embodiment is substantially the same as that described above in conjunction with FIG. 2. In other words, as the dough material is forced through the die housing 90, it emerges as a tubular extrudate having a plurality of transverse corrugations.

Figure 8:
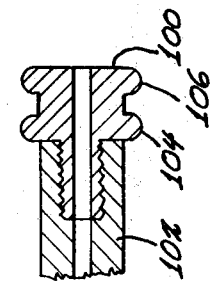
FIG. 8 illustrates another embodiment of the invention.

FIG. 8 illustrates a further modification of a back-pressure producing device. In this embodiment, an end piece 100 is threadedly inserted into the projecting end of a mandrel stem 102, the mandrel stem being similar to those described hereinbefore. The end piece 100 is provided with a pair of integral ring-shaped members 104 and 106 which are thus positioned proximate the end of the stem. Passages 108 and 110 in the mandrel 102 and end piece 100 respectively, permit a gaseous medium to flow through these members. The end piece 100, and more particularly the members 104 and 106 restrain the free flow of material through an extrusion orifice in much the same manner as that described in conjunction with FIG. 2.

In the above description and attached drawings, a disclosure of the principles of this invention is presented together with some of the embodiments by which the invention may be carried out.

Now therefore, we claim:

1. An extrusion apparatus for forming a tubular extrudate having a plurality of transverse corrugations comprising a die housing provided with a die chamber therein which terminates with a die opening having a prescribed shape, an elongate mandrel within the die chamber, means for positioning said mandrel within said chamber so that one of its ends projects into said die opening, thereby defining an annular orifice, and stationary means forming a part of said extrusion apparatus for restraining the free flow of the extrudate through said orifice thereby exerting a backpressure on said extrudate and causing it to form said transverse corrugations.

2. The combination of claim 1 wherein said stationary restraining means is positioned externally of the die chamber proximate said annular orifice.

3. The combination of claim 2 wherein the mandrel end projects through the die opening, and said stationary restraining means are positioned proximate the end of said mandrel for restraining said flow of material through the orifice, said stationary restraining means being positioned within tubular extrudate as the extrudate flows through the orifice.

4. The combination of claim 3 wherein a flexible tube is secured to the projecting end of the mandrel, and at least one ring member is provided which surrounds said tube proximate the projecting end of the mandrel.

5. The combination of claim 3 wherein an end piece is secured to the projecting end of said mandrel, said end piece having at least one ring-shaped member thereon which exerts a back-pressure against the extrudate as it emerges through the extrusion orifice.

6. The combination of claim 2 wherein said stationary restraining means includes a tubular cowling which surrounds the discharge end of the extrusion apparatus, means for attaching said cowling to the die housing proximate said die opening, said cowling having an internal diameter which is substantially the same as the desired external diameter of the extrudate.

7. The combination of claim 6 wherein at least one passage is provided in said cowling for directing a gaseous medium into the cowling.

8. The combination of claim 1 wherein the mandrel is provided with a passage therein which extends parallel to the longitudinal axis of the mandrel, said passage providing a conduit for discharging a gaseous medium into the tubular extrudate.

9. The combination of claim 1 wherein the die opening has a substantially circular cross-sectional shape, and the end of the mandrel has a substantially circular cross-sectional shape.

References Cited

UNITED STATES PATENTS

| | | | |
|---|---|---|---|
| 2,708,772 | 5/1955 | Moncrieff | 18—14X |
| 2,904,126 | 6/1960 | Sheridan | 18—14X |
| 3,017,339 | 1/1962 | Dewey | 18—14X |
| 3,184,793 | 5/1965 | Plourde | 18—14 |
| 3,187,383 | 6/1965 | Bacchus et al. | 18—14 |
| 3,212,135 | 10/1965 | Branscum | 18—14 |
| 3,286,305 | 11/1966 | Zeckel | 18—14X |
| 3,346,921 | 10/1967 | Bunish et al. | 18—14 |

J. SPENCER OVERHOLSER, Primary Examiner

M. O. SUTTON, Assistant Examiner